Sept. 22, 1970               R. L. FIFER               3,529,725
APPARATUS FOR ACTIVATED SLUDGE TREATMENT
OF OXYGEN DEMANDING WASTES
Filed June 30, 1969

INVENTOR.
ROLLAND L. FIFER
BY *Norman L. Wilson Jr.*
HIS ATTORNEY 3,529,725
APPARATUS FOR ACTIVATED SLUDGE TREATMENT OF OXYGEN DEMANDING WASTES
Rolland L. Fifer, 6211 Glen Hill Road,
Louisville, Ky. 40222
Filed June 30, 1969, Ser. No. 837,402
Int. Cl. C02c 1/12
U.S. Cl. 210—220                    10 Claims

ABSTRACT OF THE DISCLOSURE

The activated sludge treatment of oxygen demanding wastes involves the use of a tank in which the wastes are mixed with previously activated sludge and subjected to the action of bacteria, oxygen being necessary for bacterial action. Operation requires that activated sludge treatment aeration tanks be higher than they are wide or long. Hence these tanks have not been used on boats, buses and the like. The unit herein overcomes the requirement by chute means dividing the tank into concentric aeration zones.

BACKGROUND OF THE INVENTION

Figure 1:
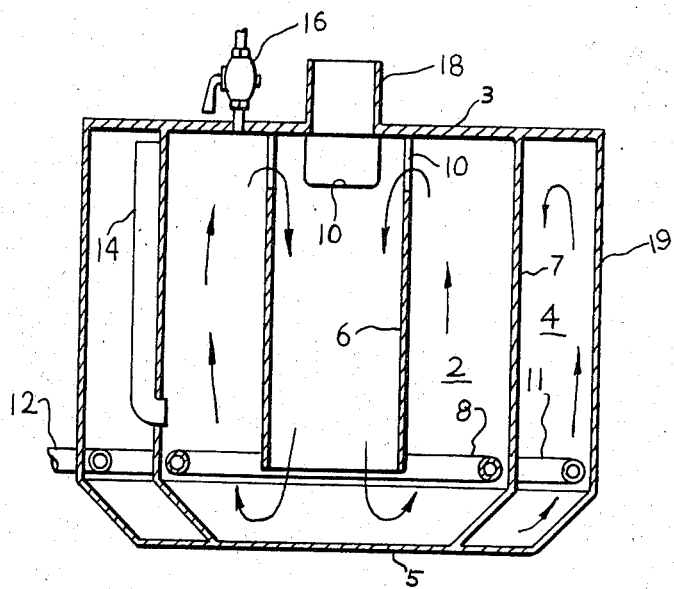

The present invention relates to waste treatment plants of the activated sludge type. In a specific aspect the invention pertains to aerobic sewage treatment plants particularly suited for use in such confined spaces as on buses, boats, aircraft and boat docks.

In the activated sludge treatment of oxygen demanding wastes the method of treatment involves the use of a tank in which sewage is mixed with previously activated sludge and subjected to the action of bacteria. This aerobic treatment is usually carried out in large tanks. Ordinarily the speed of movement of sewage through the tank is slow so that the sewage will remain in the tank a sufficient length of time to allow the bacteria to properly act upon the sewage. Since oxygen is necessary for bacterial action, air distributing means are employed, and these means are usually so arranged as to make it possible for the sewage to receive and absorb from the air as much oxygen as is necessary to support the bacterial action. In order to procure proper action it is also essential to keep the body of sewage in substantially constant movement to avoid any settling or separating out of heavier or more solid particles. Aerobic treatment tanks must, then, be so constructed as to perform the functions of circulation and mixing for a period of time sufficient to purify the material so that the effluent therefrom has a safe biological oxygen demand (B.O.D.).

Sewage aeration tanks are usually at least as high, and generally two to five times as high, as they are wide, with air being introduced at various points in the tank, usually near the bottom. In addition they are two to ten times as long as they are wide. These dimensions are necessary in order that the air introduced will circulate sufficiently to keep a given amount of solid matter in suspension, to prevent settling of solid portions, and to avoid stagnant or quiescent zones. For these reasons it has not been possible to depart drastically from the minimum height to width to length ratios, length being its longer dimension, width its shorter. Thus, in the case of an aeration tank for boats, planes, and the like which must fit in low wide spaces, longer, or both longer and wider, than they are high, it is extremely difficult to introduce air without quiescent zones. As a consequence, separation and settlement will result in sewage going septic, interfering with proper bacterial action, resulting in an effluent with a high B.O.D. content.

Since air must circulate with respect to the locus of its introduction in a turbulent flow pattern to effect maximum suspension, the production of waste treatment plants which are not as high as they are wide has not been feasible. As an example U.S. 2,616,848 pertains to a sewage treatment unit which is suitable for very small installations. However, it is noted that the height of aeration chambers 14 and 15 by far exceeds their lengths and widths. If required height and width dimensions are not met, other means for obtaining circulation must be utilized. This is illustrated in U.S. 3,271,304 which shows another waste treatment unit of the aerobic type. In this installation deflector plates and venturi-type aspirators are employed in order to maximize circulation. Such devices however have not been completely satisfactory. A unit of adequate capacity in which the effluent is of such low B.O.D. that it may safely be dumped into streams and water courses has not been provided for installation in boats, buses, planes and in other low, confined spaces where available dimensions are width and length with only limited usable height space. For this reason, the practice in such instances has been to use holding tanks to store sewage until it can be pumped into a treating plant.

SUMMARY OF THE INVENTION

In large, high treatment plants it is important to establish a circulation which effects virtually complete aeration of liquid oxygen demanding wastes. Means are provided herein for similarly maximizing circulation for as complete oxidation and bacterial action as possible in low units. In accordance with this invention an improved aeration apparatus of the type including an aeration chamber and a lid, is provided for use in low wide spaces. Extending downwardly from the underside of the lid but stopping short of the bottom of the aeration chamber is a chute which divides the aeration chamber into concentric aeration zones in communication with each other at their lower ends forming a single open zone of communication beneath the chute. The chute is provided with portholes in the upper portion thereof at the normal liquid level and it has an open lower end. A raw sewage inlet opens into an aeration zone either within or beside the chute. Below the chute air diffuser means are adapted to inject air into each of the concentric aeration zones formed.

DETAILED DESCRIPTION OF THE INVENTION

The most compact apparatus within the contemplation of this invention is illustrated in the drawings.

FIG. 1 is a vertical sectional view of a preferred apparatus.

Figure 2:
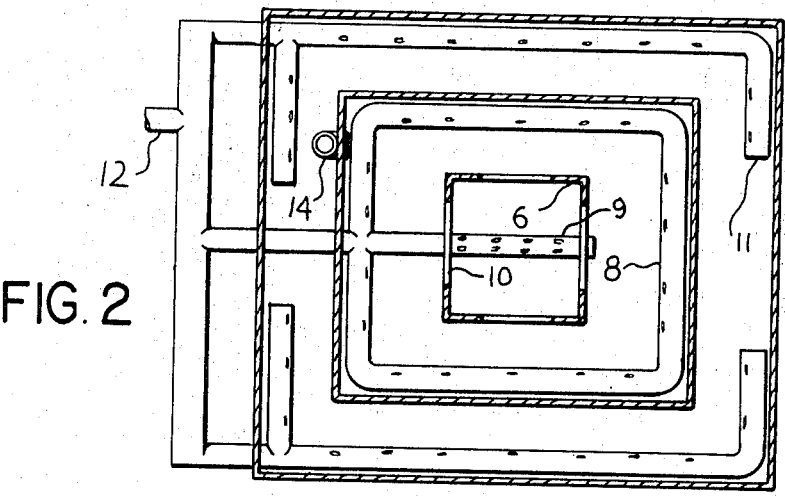

In FIG. 2 a top sectional view of the apparatus is illustrated.

Referring now to FIG. 1, the treatment plant consists of an aeration chamber 2 and a surrounding purification chamber 4. Aeration chamber 2, formed by top 3, bottom 5, and sidewalls 7, is constructed preferably of metal or plastic. Due to the width of the aeration chamber, it would be difficult to bring about adequate air introduction to break up and properly aerate the solids in the chamber. In order to overcome this problem a chute 6 is provided.

Chute 6 preferably is integral with the top of the unit, but it can stand on legs within the aeration chamber. In either event chute 6 will be tubular with an open lower end, and it will depend from the lid, extending downwardly into aeration chamber 2, and dividing it into two aeration zones concentric with each other. The bottom of the chute opens into the aeration chamber. Near the top of chute 6 portholes 10 are cut through which recirculating effluent and air may flow. An influent pipe can be located beside the chute. However, it is preferred that the influent pipe be located at the head of chute 6, as shown at 18 in FIG. 1.

As is customary, the lower portion of the aeration chamber contains injection means for diffusing air throughout each aeration zone. This can be accomplished by nozzle arrangements or by means of diffuser tubes. Diffuser lines can be placed across each zone, with a sufficient number of nozzles or orifices in each to release air bubbles throughout the aeration zone. Desirably a diffuser line conforming in size and shape to the cross section of a chute is located beneath the chute, to operate as set forth in Ser. No. 688,237 filed Dec. 5, 1967, and now U.S. Pat. 3,476,250 issued Nov. 4, 1969. In this instance the diffuser tube beneath the chute would be provided with two sets of orifices or nozzles, every other orifice being a member of one set, the alternate orifices being members of the other set. The orifices of one set would be directed to the aeration zone inside of the chute, whereas the orifices of the other set would be diverted to the aeration zone outside the chute. The advantage of the arrangement is that a single diffuser line can be used. In the embodiment illustrated, a plurality of diffuser lines such as 8 and 9 are employed. Within and near the bottom of the aeration zone outside chute 6 a diffusion tube 8 is located for the aeration of this zone. Aeration within chute 6 is accomplished by diffuser tube 9.

It can be seen that operation of the apparatus of this invention is much like that of my copending application Ser. No. 688,237. By means of chutes aeration zones are provided so that circulation is maximized for as much turbulence and complete bacterial action as possible. As or after raw sewage enters influent inlet 18, air will be brought through air line 12. Air vent valve 16 is opened during operation so that there is no pressure buildup within the tank. Portholes 10 allow air to pass through to the vent, and they also permit liquid circulation. As in the case of Ser. No. 688,237 the unit is operated at an oxygen demand in the range of 2.2 to 3.5 parts per million for a B.O.D. reduction greater than 90 percent.

When aeration in each zone defined by a chute within the aeration chamber is complete the bottom quantity will be retained for bacterial retention. In addition, although not necessary, regulations frequently require the use of another chamber for chlorine addition to insure absolute purification of effluent. This purification chamber can be a separate vessel. However a particularly compact purification chamber is incorporated in the unit illustrated. The purification chamber herein is in the form of a jacket 19 surrounding aeration chamber wall 7. Air inlet 11 assists in mixing the chlorine or other chemical with the aerated effluent. After aeration and required B.O.D. reduction in the zone in the aeration chamber, valve 16 is closed. As the quantity of air in the aeration chamber increases, its pressure lowers the liquid level by forcing effluent through outlet 14 into purification chamber 4. Chamber 4 communicates with an effluent outlet (not shown).

It can be seen that this invention makes possible the maintenance of efficient air circulation in an elongated aeration tank. The invention departs from my Ser. No. 688,237 by the provisio of an apparatus wherein the aeration chamber is divided into concentric aeration zones. The division into aeration zones can be accomplished by the inclusion of one or more chutes. The apparatus of this invention thus contemplates an aeration chamber divided by means of at least one chute into concentric aeration zones wherein desired air circulation is achieved. A zone of communication is formed beneath the chute to permit flow of waste liquors between the aeration zones so as to equalize the B.O.D. in each zone. The zone or reservoir beneath the chute permits easier withdrawal of the treated effluent. As can be seen from FIG. 2 preferably the chute and aeration chamber will have similar cross-sectional configurations in the geometric sense, rectangular cross sections being illustrated. Obviously the cross sections can be square or circular as well. Thus the aeration chamber can be cylindrical and the chute polyhedral; the aeration chamber can be polyhedral and the chute cylindrical. In addition the chute and aeration chamber can both be either polyhedral or cylindrical. Other variations will occur to those skilled in the art.

What is claimed is:

1. In a treatment apparatus for oxygen demanding wastes of the activated sludge type which includes an aeration chamber bottom but stopping short of the bottom therein to maintain sewage solids in suspension and to provide oxygen for aerobic biological action, wherein the aeration chamber is elongated so as to fit into vehicles such as boats, buses and trailers, an aeration chamber defined by a bottom, side walls and a lid integral therewith, a chute within said aeration chamber extending downwardly from the underside of the lid toward the aeration chamber bottom but stopping short of the bottom to divide the aeration chamber into concentric aeration zones in communication with each other at their lower ends, forming a single open zone of communication, said chute having portholes in the upper portion thereof at the normal liquid level, a raw sewage inlet in the top of said aeration chamber opening into an aeration zone, air diffuser means below said chute adapted to inject air into each of the concentric aeration zones.

2. The apparatus of claim 1 wherein an outer purification chamber is jacketed around and thereby completely surrounds the aeration chamber and wherein the raw sewage inlet is located at the head of the chute.

3. The apparatus of claim 1 wherein the chute and aeration chamber are cylindrical.

4. The apparatus of claim 1 wherein the chute and aeration chamber are polyhedral.

5. The apparatus of claim 1 wherein the chute is cylindrical and the aeration chamber is polyhedral.

6. The apparatus of claim 1 wherein the chute is polyhedral and the aeration chamber is cylindrical.

7. The apparatus of claim 1 wherein the air diffuser means includes an air diffuser header conforming in size and shape to the cross section of the chute, wherein it is located directly beneath said chute and wherein it is provided with alternately directed perforations, one set adapted to dispense air into the aeration zone within the chute and one set into the aeration zone surrounding the chute.

8. The apparatus of claim 1 wherein a plurality of chutes are attached to the underside of the aeration chamber lid.

9. In the apparatus of claim 1, means for forcing air into the upper portion of the aeration chamber above liquid therein to force said liquid into an effluent outlet by virtue of the air pressure of the surface thereof.

10. The apparatus of claim 2 wherein the purification chamber jacketed around the outside of the aeration chamber is polyhedral.

References Cited

UNITED STATES PATENTS

| 830,552 | 9/1906 | Zeigler | 210—221 X |
| 3,152,982 | 10/1964 | Pagnotti | 210—14 X |

JAMES L. DE CESARE, Primary Examiner

U.S. Cl. X.R.

210—256

UNITED STATES PATENT OFFICE
CERTIFICATE OF CORRECTION

Patent No. 3,529,725           Dated September 22, 1970

Inventor(s) Rolland L. Fifer

It is certified that error appears in the above-identified patent and that said Letters Patent are hereby corrected as shown below:

Column 2, line 9, for "for" read -- of --; column 3, line 54, for "zone" read -- zones --; column 3, line 63, for "provisio" read -- provision --; column 4, line 14, for "bottom but stopping short of the bottom" read -- with air diffuser means positioned --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents